United States Patent Office 2,709,683
Patented May 31, 1955

2,709,683

COMPOSITION FOR PRODUCING DETERGENT POLYGLYCOL-PHENOL CONDENSATION PRODUCTS

Bernard R. Sarchet, Beaver, Pa., assignor to Koppers Company, Inc., a corporation of Delaware No Drawing. Application March 8, 1951,
Serial No. 214,627

2 Claims. (Cl. 252—89)

This invention relates to detergents and their manufacture and is particularly directed to polyglycol-phenol condensation products prepared from a liquid mixture of di-tert-butyl-meta-cresol and nonyl phenol.

Polyglycol-phenol condensation products are prepared by condensing a suitable phenol with ethylene oxide with or without subsequent sulfonation of the free hydroxyl on the polyglycol chain. Alternatively a polyglycol halide may be condensed with an alkali metal phenate with or without subsequent sulfation to give a similar product.

In making detergent polyglycol-phenol condensation products long chain alkyl phenols are commonly used. Alternatively a polyalkyl phenol having the equivalent total number of carbon atoms in the alkyl chains may be used. However, with some such polyalkyl phenols which are solid at normal temperatures such as di-tert-butyl-meta-cresol, difficulty has been encountered in carrying out the condensation.

It is an object of this invention, therefore, to provide new and improved processes for producing detergent polyglycol-phenol condensation products from a normally solid polyalkyl phenol, namely, di-tert-butyl-meta-cresol. Another object of the invention is to produce novel compositions which are advantageous in preparing detergent polyglycol-phenol condensation products from normally solid phenols. A still further object of the invention is to provide novel and improved polyglycol-phenol condensation products prepared from normally solid polyalkyl phenols.

I have now found that these objects are accomplished in the present invention by incorporating in di-tert-butyl-meta-cresol an amount of nonyl phenol sufficient to give a liquid product and preparing a detergent polyglycol-phenol condensation product therefrom by any suitable method for preparing polyglycol-phenol condensation products. In this manner I am able not only to avoid the disadvantages of the prior art but to obtain new and improved detergent polyglycol-phenol condensation products which per unit detergent efficiency are cheaper to produce than the prior art detergent polyglycol-phenol condensation products having an equivalent degree of alkylation.

Detergent polyglycol-phenol condensation products may be represented by the general formula:

$$PhO(CH_2CH_2O)_nCH_2CH_2X$$

in which X is hydroxyl or sulfate, $n$ is an integer, and Ph is the phenol residue. By phenol residue I mean the radical obtained by removing the hydroxyl group from a phenol. The integer $n$ may vary over a wide range depending upon the equivalent length of the alkyl chain of the phenol, the type of detergent wanted, and whether or not the product is sulfated. Thus where X is sulfate, it is ordinarily desirable for the integer $n$ to have a value of from 2 to 5 inclusive, whereas when X is hydroxyl the value of $n$ may range from 5 up to 11 or more.

That which characterizes the novel detergents of my invention is the fact that the residue Ph is derived from a mixture of di-tert-butyl-meta-cresol and nonyl phenol containing sufficient nonyl phenol to give a product which is liquid at room temperatures.

The invention may be more fully understood by reference to the following examples in which the parts are by weight unless otherwise specified.

*Example I*

110 parts of a mixture containing 70 per cent of technical di-tert-butyl-meta-cresol and 30 per cent technical nonyl phenol is mixed with 100 parts water and 28 parts potassium hydroxide pellets to form the potassium phenolates of the contained phenols. 250 parts of water is then added and the solution is extracted with 44 parts of benzene to remove unreacted phenols. 205 parts of polyethylene glycol chloride having an average molecular weight of 410 is added and the mixture is heated with stirring and with continuous removal of water by means of a Dean Stark water trap until the dark green color turns to light amber as the water is eliminated and the temperature rises to 125° C. The reaction mixture is then raised to 240° C. and then cooled and the precipitated potassium chloride filtered off leaving a clear, viscous, amber liquid as product. The product is a mixture of 70 parts polyglycol-di-tert-butyl-meta-cresol condensation product with 30 parts polyglycol-nonyl phenol condensation product in which the integer $n$ averages between 7 and 8.

*Example II*

232 parts of a mixture containing 70% technical di-tert-butyl-meta-cresol and 30% technical nonyl phenol is placed in an autoclave along with 1.2 parts flaked sodium hydroxide and the mixture is heated to 150° C. with stirring. Stirring is then stopped and the air in the apparatus displaced with nitrogen which in turn is displaced with ethylene oxide. The autoclave is placed under a pressure of ethylene oxide of about 10 to 15 pounds per square inch gauge and ethylene oxide is run in as required to maintain the pressure within this range. After 416 pounds of ethylene oxide is run into the autoclave, the mixture is cooled to about 100° C. with stirring and the vacuum produced is corrected with nitrogen and the residual ethylene oxide is swept out with a current of nitrogen, leaving in the autoclave a clear, viscous, amber liquid as product. This product is a mixture of 70 parts of polyglycol-di-tert-butyl-meta-cresol condensation product with 30 parts polyglycol-nonyl phenol condensation product in which the integer $n$ averages about 8.

If desired the polyglycol-phenol condensation products thus obtained may be sulfated using aminosulfonic acid, chlorosulfonic acid or oleum as a sulfating agent and the hydrogen sulfate thus obtained converted to a salt with sodium hydroxide or other alkali. Alternatively the sodium salt may be formed by sulfonataing with sodium chlorosulfonate.

In the foregoing examples the nonyl phenol was prepared by alkylating phenol with nonenes having a boiling range of about 115–140° C. obtained from petroleum gases using sulfuric acid as a catalyst. The product is a mixture of isomeric paranonyl phenols having a boiling range of about 290–310° C. In place of nonenes obtained from petroleum gases I may use the nonenes obtained by polymerizing propylene. Similarly the nonyl phenols may be prepared with other alkylating agents such as nonyl alcohols and nonyl halides. The nonyl radical may be straight chain or branched chain and primary, secondary, or tertiary.

The di-tert-butyl-meta-cresol is obtained by alkylating a mixture of meta- and para-cresol with isobutylene using sulfuric acid as a catalyst. The alkylate is fractionated to separate di-tert-butyl-meta-cresol and di-tert-butyl-para-cresol. The product contains about 90 per cent or more of 4,6-di-tert-butyl-meta-cresol with the balance largely 4,6-sec-butyl-meta-cresol depending upon the purity of the isobutylene used in the process.

The amount of nonyl phenol is that required to give a liquid product with the di-tert-butyl-meta-cresol. Preferably it is maintained substantially at the minimum necessary for this purpose. It has been found that 30 per cent of nonyl phenol is most desirable not only from the standpoint of the physical properties of the mixture, but also from the final products of the detergent polyglycol-phenol condensation product. This may be varied as much as ± 5 per cent without substantial change in these properties. Any greater amount of nonyl phenol may be used, if desired, but no advantage is obtained which will justify the added cost. Ordinarily it will not be necessary or desirable to use more than 70 per cent of nonyl phenol.

The detergent polyglycol-phenol condensation product thus obtained may be utilized as such or it may be diluted with suitable solvents or absorbed on suitable solids.

I claim:

1. A composition of matter consisting essentially of a liquid mixture of di-tert-butyl-meta-cresol and nonyl phenol containing about 30 per cent nonyl phenol and the balance di-tert-butyl-meta-cresol.

2. A composition of matter consisting essentially of a liquid mixture of di-tert-butyl-meta-cresol and nonyl-phenol containing about 30 to about 70 per cent nonyl-phenol and the balance di-tert-butyl-meta-cresol.

References Cited in the file of this patent

UNITED STATES PATENTS

| | | |
|---|---|---|
| 1,970,578 | Schoeller | Aug. 21, 1934 |
| 2,213,477 | Steindorff | Sept. 3, 1940 |
| 2,623,856 | Sanders | Dec. 30, 1952 |

OTHER REFERENCES

Schwartz and Perry, Surface Active Agents (1949), page 202-4.